Feb. 24, 1925.
F. M. BLAKE
1,527,624
SAFETY APPLIANCE FOR IGNITION AND OTHER CIRCUITS ON MOTOR VEHICLES
Filed April 16, 1921
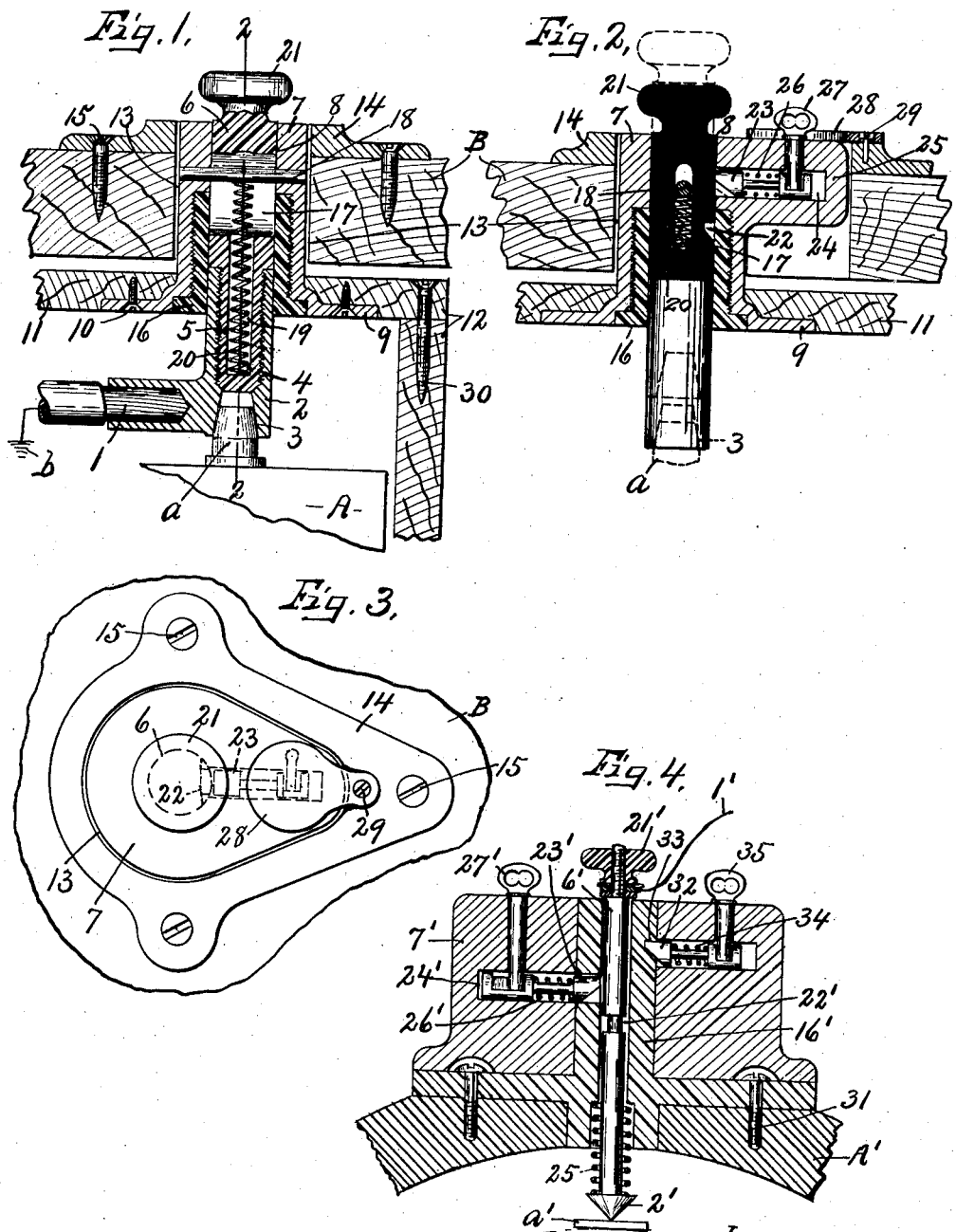
INVENTOR
F. M. Blake
By
Howard G. Denison
ATTORNEY.

Patented Feb. 24, 1925.

1,527,624

UNITED STATES PATENT OFFICE.

FRED M. BLAKE, OF FULTON, NEW YORK.

SAFETY APPLIANCE FOR IGNITION AND OTHER CIRCUITS ON MOTOR VEHICLES.

Application filed April 16, 1921. Serial No. 462,018.

*To all whom it may concern:*

Be it known that I, FRED M. BLAKE, of Fulton in the county of Oswego in the State of New York, have invented new and useful Improvements in Safety Appliances for Ignition and Other Circuits on Motor Vehicles, of which the following, taken in connection with the accompanying drawings, is a full, clear, and exact description.

This invention relates to a safety device for storage battery circuits as used more particularly in motor vehicles for ignition, lighting and other uses, the object being to guard against fires from short circuit, theft of the machine, and running down of the battery current from accidental leakages, and at the same time to protect the battery terminals and their circuit connections against the accumulation of or contact with foreign matter or objects, which would in any way tend to reduce the current voltage of the battery or produce short circuits in and around the battery terminals reference being had to my pending applications: Ser. Nos. 517,096, filed Nov. 22, 1921; 568,681, filed June 16, 1922; 586,822, filed Sept. 8, 1922.

One of the specific objects is to provide means operable at will whereby the operator may easily and quickly break or open the ground connection of the battery in case of fire from short circuit anywhere in the ignition, lighting or other circuit of a motor vehicle.

Another object is to provide means including a key operated or released locking member for automatically locking the movable terminal connection in its open position to prevent theft of the car.

Other objects and uses relating to specific parts of the device will be brought out in the following description.

In the drawings:

Figure 1 is a vertical sectional view of a safety appliance embodying the various features of my invention showing also a portion of the storage battery and a part of the housing for the terminal connections.

Figure 2 is a sectional view taken in the plane of line 2—2, Figure 1 except that the movable terminal connection and its operating means are shown mainly in elevation and that the battery is omitted.

Figure 3 is a top plan of the device shown in Figures 1 and 2 except that the floor board is removed.

Figure 4 is a vertical sectional view of a modified form of my device as used in connection with magneto circuit.

In Figures 1, 2 and 3 the safety appliance is adapted to be used in connection with a storage battery —A— having suitable terminals —a— for connection with the several circuits commonly used in motor vehicles, the battery being usually supported upon the chassis below the floor board —B— which may be removable to permit access to the battery and to the terminals thereof.

The several circuits and one of the terminals of the battery are usually connected to a common ground or return current wire and it therefore follows that if the ground connection of the battery is broken or open, it will effectively cut out all of the circuits, and while some of the features of my invention are applicable to both of the battery terminals, other features are particularly applicable to the ground connection of the several circuits with their corresponding terminal of the battery, and in order that my invention may be clearly understood, I have shown a portion of the return conductor —1— as grounded at —b— to which latter, the several circuits may be grounded in any well known manner to complete the same.

As illustrated, the conductor —1— is secured in one of the arms of an L-shaped terminal connection —2— of conducting material having its base provided with a tapered socket —3— adapted to fit snugly against and upon the tapered upper end of the battery terminal —a— for electrical connection therewith, the upright portion of the connection —2— being provided with an internal threaded socket —4— in which is tightly screwed the lower reduced end —5— of an insulating plug or bushing —6— preferably of vulcanized fiber or equivalent firm and durable insulation, which together with the section —2— is movable vertically or axially to make and break the connection between the section —2— and battery terminal —a—.

A suitable support or guide sleeve —7— is provided with a central vertical opening —8— in which the members —6— and —2— are movable, the lower end of said support —7— being provided with a radially projecting flange —9— secured by screws —10— to the under side of the top wall or cover —11— of a battery housing —12—.

The upper portion of the support —7— extends through an opening —13— in the floor board —B— and is surrounded by a metal wear plate —14— which is secured to the upper face of the floor board —B— by means of screws —15— to afford more or less protection to the safety appliance. The major portion of the support —7— is made of metal but the lower end of the central opening —8— is enlarged and threaded internally for receiving a screw bushing —16— of insulating material such as, vulcanized fiber, which is screwed to the under side upwardly and firmly to form a continuation of the guide-opening —8— and also to prevent contact between the section —2— and metal part of the support —7— so that those two parts are insulated from each other in all positions of adjustment of the plug section and its metal section —2—.

The insulating plug —6— is preferably cylindrical and provided near its upper end with a diametrically extending slot —17— which is elongated vertically for receiving a diametrically extending pin —18— having its ends secured in the opposite sides of the support —7—, as shown in Figure 1, to hold the plug —6— against turning movement relatively to the support —7— and at the same time permitting vertical movement of the plug.

The bushing or plug —6— is provided with a central lengthwise socket —19— having its lower end closed to form an abutment for one end of a coil spring —20—, the other end of which bears against the under side of the pin —18—, said spring serving as a retracting means for the plunger or plug —6— to yieldingly hold the section —2— in electrical contact with the battery terminal —a—.

The upper end of the plunger —6— is provided with a handle —21— by which it together with the section —2— may be drawn upwardly against the action of the retracting spring —20— for disconnecting the section —2— from the battery terminal —a— and thereby breaking all of the circuits leading from said battery or deriving current therefrom.

Suitable means is provided for holding the plunger —6— and its terminal connection —2— in their elevated position or out of contact with the terminal —a—, and for this purpose the plunger —6— is provided in one side with a notch —22— adapted to receive one end of the locking-bolt —23— which is slidable radially of the plunger in a socket —24— in an extension —25— of the sleeve —7—, said locking-bolt being automatically forced into the notch —22— when the latter is registered therewith by means of a coil spring —26— for automatically locking the plunger —6— in its elevated position.

The locking-bolt —23— can only be withdrawn against the action of the spring —26— by means of a key —27— carried by the operator and adapted to be inserted in a key-hole in the top portion of the extension —25— and engaged with the outer end of the locking-bolt —23— so that when the key is properly registered with the locking-bolt and turned, it will withdraw the bolt from engagement with the plunger —6— and thereby allow the spring —20— to restore the electrical connection between the parts —2— and —a—, it being understood that as soon as the electrical connection is restored, the key is withdrawn from the device and is also removed when the plunger is locked in its elevated position to break the ground connection of the battery at the terminal —a—.

A cover plate —28— is hinged at —29— to the wear plate —14— to swing to and from a position across the key-hole in the upper side of the extension —26— and when closed, serves to protect the locking-bolt against deposits of foreign matter or in tampering with the lock.

The housing —12— is adapted to enclose the entire battery and its terminals —a—, its cover plate —11— being removably secured to the sides by screws —30— and serves as a convenient support for the safety appliance, previously described, in addition to its function of excluding foreign matter from the terminals and connections, and also avoiding contact of external objects with said terminals and connections to reduce the liability of short circuits to a minimum.

In Figure 4 I have shown a somewhat similar safety appliance as used in connection with magneto ignition and lighting circuits of Ford cars and analagous machines in which —A'— represents the magneto casing or housing, —a'—, one of the magneto terminals adapted to be engaged by contact member or electrical connection —2'— on the lower end of a vertically movable plunger —6'—, which may be raised vertically by hand or otherwise against the action of a retracting spring —25'— to break the electrical connection between the part —2'— and —a'—, said spring serving to normally hold those parts in contact.

The plunger —6'— is movable vertically in a central opening in an insulating bushing —16'— which is secured by screws —31— to the upper side of the magneto housing —A'— and extends upwardly therefrom through a metal protector sleeve —7'—. The plunger —6'— is an electrical conductor and has its upper end threaded and engaged by a nut —21'— for attaching the adjacent end of a conductor —1'— to the plunger and constituting the ground connection of the magneto circuit.

The central portion of the plunger —6'— is provided with an annular groove or notch —22'— for receiving one end of the locking-bolt —23'— which is movable in a radial socket —24'— in the sleeve —7'— and is forced to its locking position by means of a coil spring —26'— when the notch or groove —22'— is registered therewith, said bolt being adapted to be withdrawn from its locking position against the action of the retracting spring —26'— by means of a key —27'— the latter being removed when not in use.

That is, when the plunger —6'— is drawn upwardly by means of the handle —21'— to disconnect its contact member —2'— from the terminal —a'—, it is locked in its open position by the bolt —23'— and effectively prevents theft of the machine and also reduces the liability of leakage and short circuits.

The sleeve —7'—is preferably removable but is normally locked in position to the insulator —16'— by means of a locking bolt —32— adapted to enter a notch —33— in one side of the upwardly projecting portion of said insulator but may be withdrawn from its locking position against the action of a retracting spring —34— by means of a key —35—, the latter being removed when not in use.

It will be seen from the foregoing description that in case of fire or extensive heat in any part of the electric circuit arising from short circuits or other causes attributable thereto, the operator may easily and quickly raise the plunger —6— and thereby disconnect the part —2— from the terminals —a— or the part —2'— from the terminals —a'—, and that the plunger will automatically be locked in its elevated position by the locking bolt —23— or —23'—, which, aside from the fire protective advantages, previously mentioned, also serve to reduce the liability of theft of the machine, leakage of the battery through short circuit in any part of the wearing system and also greatly reduces the liability of short circuit in and around the terminals of the battery, all of which add greatly to the working efficiency of the battery and its various circuits or translating devices therein.

What I claim is:

1. In a safety appliance for motor vehicles, a storage battery for supplying current to a plurality of external translating device and a cover for the battery enclosing the terminals thereof, a grounded conductor having a contact member wholly within the cover and movable into and out of electrical contact with one of the battery terminals for making and breaking the battery circuits, and an operating member for said movable contact member extending through an opening in the cover to the exterior thereof and insulated from said contact member, and means for locking the switch member in its open position.

2. In a safety appliance for motor vehicles, an electric current generator for supplying current to external translating devices, cooperative contact members, one of which is electrically connected at all times with one pole of the generator, the other member being electrically connected at all times with the corresponding side of the external circuit and movable into and out of contact with the first named member for making and breaking the generator circuits, a housing inclosing said contact members and preventing access thereto when the cover is closed, an operating member for the movable contact member extending through an opening in the cover to the exterior thereof and insulated from said movable contact member, and means for locking said operating member and movable switch member in their open positions.

In witness whereof I have hereunto set my hand this 12th day of April 1921.

FRED M. BLAKE.

Witnesses:
H. E. CHASE,
M. R. COOKE.